US006288184B1

(12) United States Patent
Wilson, Jr. et al.

(10) Patent No.: US 6,288,184 B1
(45) Date of Patent: *Sep. 11, 2001

(54) HYDROLYTICALLY DEGRADABLE OLEFIN COPOLYMERS

(75) Inventors: Robert B. Wilson, Jr.; Sigridur Jonasdottir, both of Palo Alto, CA (US)

(73) Assignee: SRI International, Menlo Park, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/408,286

(22) Filed: Sep. 29, 1999

(51) Int. Cl.⁷ ..................................... C08F 4/64
(52) U.S. Cl. .................. 526/160; 526/266; 526/302; 526/319; 526/943
(58) Field of Search ................... 526/160, 266, 526/302, 319, 943

(56) References Cited

U.S. PATENT DOCUMENTS

| | | |
|---|---|---|
| 4,761,322 | 8/1988 | Raley . |
| 4,981,749 | 1/1991 | Kubo et al. . |
| 5,280,094 | 1/1994 | Mulhall . |
| 5,439,996 | * 8/1995 | Baird et al. ..................... 526/134 |
| 5,563,219 | 10/1996 | Yasuda et al. . |
| 5,817,394 | 10/1998 | Alikhan et al. . |
| 6,127,482 | 10/2000 | Keogh . |

FOREIGN PATENT DOCUMENTS

| | | |
|---|---|---|
| 0442476 | 8/1991 | (EP) . |
| 0462588 | 12/1991 | (EP) . |
| 0799842 | 10/1997 | (EP) . |
| 1041580 A1 | 4/2000 | (EP) . |
| WO 92/12185 | 7/1992 | (WO) . |
| WO 97/45465 | 12/1997 | (WO) . |
| WO 98/37110 | 8/1998 | (WO) . |

OTHER PUBLICATIONS

Johnson et al. (1995), "New Pd(II)– and Ni(II)–Based Catalysts for Polymerization of Ethylene and α–Olefins," *J. Am. Chem. Soc.* 117(23):6414–6415. (no month).
Johnson et al. (1996), "Copolymerization of Ethylene and Propylene with Functionalized Vinyl Monomers by Palladium(II)–Catalysts," *J. Am. Chem Soc.* 118(1):267–268. (no month).
Killian et al. (1997), "Preparation of Linear α–Olefins Using Cationic Nickel(II) α–Diimine Catalysts," *Organometallics* 16(10):2005–2007. (no month).
Ouchi et al. (1968), "Copolymerization of Diallylidenepentaerythritol," *J. Chem. Soc. Japan* 71(7):1078–1082.
Small et al. (1998), "Highly Active Iron and Cobalt Catalysts for the Polymerization of Ethylene," *J. Am. Chem. Soc.* 120(16):4049–4050. (no month).
Smorada (1987), *Encyclopedia of Polymer Science and Engineering* 10:227–253, J.I. Kroschwitz, ed., New York: John Wiley & Sons.
Smorada (1987), *Encyclopedia of Polymer Science and Engineering*10:227–253, J.I. Kroschwitz et al., New York: John Wiley & Sons.

* cited by examiner

*Primary Examiner*—David W. Wu
*Assistant Examiner*—Caixià Lu
(74) *Attorney, Agent, or Firm*—Dianne E. Reed; J. Elin Hartrum; Reed & Associates

(57) ABSTRACT

Hydrolytically degradable olefin copolymers, such as ethylene copolymers, contain a hydrolyzable component in the backbone that allows the copolymer to be broken down into dispersable fragments upon exposure to aqueous conditions. The copolymers are prepared by transition metal-catalyzed polymerization.

16 Claims, 3 Drawing Sheets

Hydrolyzable Comonomer Used in Example 1(a)

Copolymer From Example 1(a)

Hydrolysis Data

HYDROLYTICALLY DEGRADABLE OLEFIN COPOLYMERS

TECHNICAL FIELD

The present invention relates to olefin copolymers, such as ethylene copolymers, containing a hydrolyzable component that allows the copolymer to be broken down into dispersable fragments upon exposure to aqueous conditions. The copolymers are prepared by transition metal-catalyzed polymerization.

REFERENCES

Alikhan, M. I. et al., U.S. Pat. No. 5,817,394 (1998).

Goto, Y. et al., EP 0462588 A (12/1991).

Hajime, Y. et al., EP 0442476 A2 (8/1991).

Johnson, L. K. et al., *J. Am. Chem. Soc.* 117:6414–5 (1995).

Johnson, L. K. et al., *J. Am. Chem. Soc.* 118:267–8 (1996).

E. Kubo et al., U.S. Pat. No. 4,981,749 (1991).

Ouchi et al., *J Chem. Soc. Japan* 71(7):1078–82 (1968).

Killian, C. M. et al., *Organometallics* 16:2005–7 (1997).

Raley, J. M., U.S. Pat. No. 4,761,322 (1988).

Small, B. L. et al., *J Am. Chem. Soc.* 120:4049–50 (1998).

Smorada, R. L., in *Encycl. Polym. Sci. Eng.*, Vol. 10, J. I. Kroschwitz, ed., (New York: John Wiley & Sons, 1987) at pp. 227–53.

Yasuda, H. et al., EP 0799842 A1 (10/1997).

Yasuda, H. et al., U.S. Pat. No. 5,563,219 (10/1996).

BACKGROUND

Over the past several years, a great deal of research has been directed to the design of biodegradable polymers. Concern over waste disposal, particularly of packaging materials, disposable diapers, etc., motivates much of this work. Products designed to degrade after their intended use may be composed of photosensitive or hydrolytically degradable polymers. Polymers intended to degrade during use, as in controlled-release delivery systems, are nearly always hydrolytically degradable. Hydrolytically degradable polymers are frequently polyester-based, prepared by condensation or radical polymerization. Also employed are physically or chemically bonded blends of synthetic polymers with biomaterials such as starch.

For many purposes, the superior physical properties provided by polyolefins prepared by addition polymerization are desirable. To date, however, incorporation of polar groups into such polyolefins has had limited success, since many polar monomers poison, or competitively coordinate with, the organometallic polymerization catalysts that are typically used. Copolymers of olefins, such as ethylene, with polar monomers such as acrylates, were initially limited to block copolymers, formed by two-stage polymerization, e.g., by post-polymerization of an acrylate or methacylrate monomer onto a previously formed polyolefin chain (Yasuda et al., 1996, 1997; Goto et al, Hajime et al.). Masakazu et al., in JP Kokai 4-45108 (1992), described the preparation of an ethylene copolymer containing 4.7 mole % ethyl acrylate, Mn 9,100, Mw 22,500, that show improved adhesion over polyethylene homopolymer. Johnson et al. (1996) described the formation of random olefin-acrylate copolymers using Brookhart-type catalysts. None of these polymers, however, include a hydrolyzable linkage in the backbone of the polymer, and therefore they would not be hydrolytically degradable. Ouchi et al. described free radical copolymerization of diallylidene pentaerythritol with styrene; however, incorporation of the diene monomer was low, and increased incorporation significantly decreased the intrinsic viscosity of the product. The reaction conditions would also be expected to produce a non-stereoregular polymer.

Accordingly, providing olefin copolymers that have good physical properties and stability under conditions of use, at neutral or near-neutral pH, but that degrade into soluble or easily dispersable particles in an aqueous medium would be desirable.

SUMMARY OF THE INVENTION

In one aspect, the present invention is directed to a degradable olefin copolymer. The polymer backbone comprises at least two monomer units. The first monomer unit is non-hydrolyzable and of the form —$R^1$CH—CHR$^2$—, in which $R^1$ is hydrido or alkyl and $R^2$ is hydrido, alkyl, alkenyl, aryl, alkaryl or halogen or in which $R^1$ and $R^2$ are linked to form —Q— in which Q is substituted or unsubstituted hydrocarbylene. The second monomer unit is hydrolyzable and of the form —CHR$^3$—CH—(L$^1$)$_m$—X—(L$^2$)$_n$—CH—CHR$^4$— in which $R^3$ and $R^4$ are independently hydrido or alkyl, $L^1$ and $L^2$ are optionally substituted hydrocarbylene groups, m and n are independently 0 or 1, and X is a group that is hydrolytically cleavable. Preferably, X does not include a hydroxyl group, a primary or secondary amino group, a thiol group, or a group effective to oxidize a metal center of the soluble transition metal catalyst. Examples of suitable X moieties include, but are not limited to, an acetal linkage, a ketal linkage, an ester linkage, and an imide linkage. It is also preferred that there are no adjacent hydrolyzable monomer units in the copolymer. The mole percent of the second monomer unit in the copolymer generally ranges from about 0.1 mole percent to about 50 mole percent.

In a related aspect, the invention provides a method for preparing a degradable olefinic copolymer by addition polymerization, in the presence of a suitable transition metal catalyst and a suitable catalyst activator, of a first olefinic monomer of the form CH$_2$R$^1$=CH$_2$R$^2$, wherein $R^1$ and $R^2$ are as defined above, with a second olefinic monomer of the form CHR$^3$=CH—(L$^1$)$_m$—X—(L$^2$)$_n$—CH=CHR$^4$ wherein $R^3$, $R^4$, $L^1$, $L^2$, m, n and X are as defined above.

The transition metal catalyst may be a metallocene complex of a Group IV, Group V, or Group VI transition metal, such as Ti, Hf, Zr, V, Nb, or Mo. Other effective transition metal catalysts are imine, preferably diimine, complexes of Group I or Group VIII transition metals, such as Pd, Ni, Fe, Co, Cu, Ag, and Au, and imine-containing ligands.

These and other objects and features of the invention will become more fully apparent when the following detailed description of the invention is read in conjunction with the accompanying drawings.

DETAILED DESCRIPTION OF THE INVENTION

I. TERMINOLOGY AND DEFINITIONS

Figure 1:
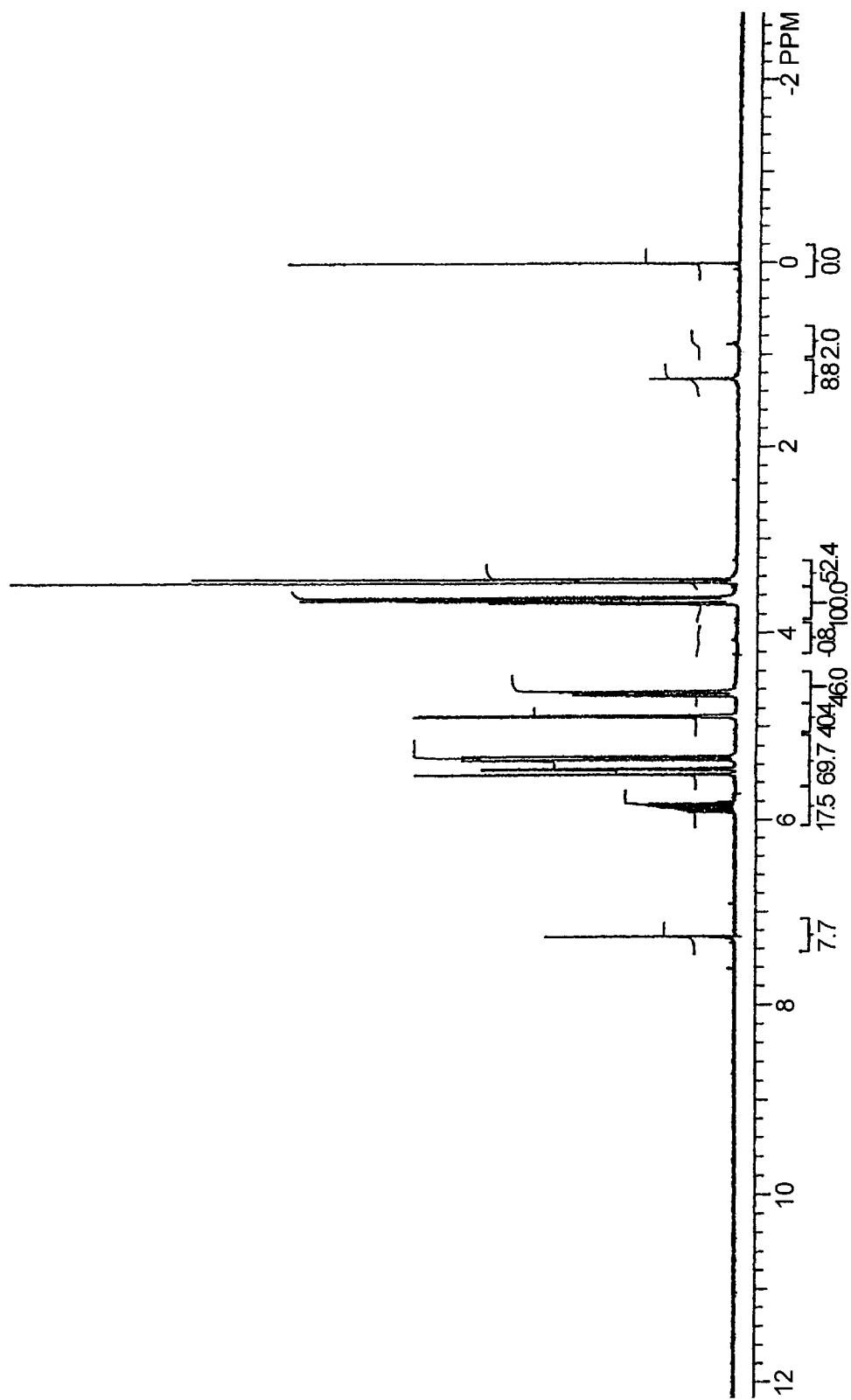
FIGS. 1 and 2 are NMR spectra of 3,9-divinyl-4,6,8,10-tetraoxaspiro[5,5]undecane (a hydrolyzable monomer) and its copolymer with ethylene, respectively, as described in Example 1(a).

Before the present compounds, compositions and methods are disclosed and described, it is to be understood that unless otherwise indicated this invention is not limited to specific molecular structures, ligands, or the like, as such may vary. It is also to be understood that the terminology used herein is for the purpose of describing particular embodiments only and is not intended to be limiting.

The terms below have the following meanings unless indicated otherwise.

It must be noted that, as used in the specification and the appended claims, the singular forms "a," "an" and "the" include plural referents unless the context clearly dictates otherwise. Thus, for example, reference to "a first monomer unit" or "a non-hydrolyzable monomer unit" includes one or more such monomer units, reference to "a second monomer unit" or "a hydrolyzable monomer unit" includes one or more such monomer units, reference to "a ligand" includes one or more ligands, and the like.

The term "alkyl" as used herein refers to a branched, unbranched or cyclic saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of one to six carbon atoms. The specific term "cycloalkyl" as used herein refers to a cyclic alkyl group of from 3 to 8 carbon atoms, such as cyclopropyl, cyclobutyl, cyclopentyl, cyclohexyl, cycloheptyl and cyclooctyl.

The term "alkylene" as used herein refers to a difunctional branched or unbranched saturated hydrocarbon group of 1 to 24 carbon atoms, such as methylene, ethylene, n-propylene, n-butylene, n-hexylene, decylene, tetradecylene, hexadecylene, and the like. The term "lower alkylene" refers to an alkylene group of one to six carbon atoms, preferably one to four carbon atoms.

The term "alkenylene" as used herein refers to a difunctional branched or unbranched hydrocarbon group of 2 to 24 carbon atoms containing at least one double bond, such as ethenylene, n-propenylene, n-butenylene, n-hexenylene, and the like. The term "lower alkenylene" refers to an alkylene group of two to six carbon atoms, preferably two to four carbon atoms.

The term "alkoxy" as used herein intends an alkyl group bound through a single, terminal ether linkage; that is, an "alkoxy" group is defined as —O-alkyl wherein alkyl is as defined above. A "lower alkoxy" group intends an alkoxy group containing one to six carbon atoms.

The term "aryl" as used herein, and unless otherwise specified, refers to an aromatic species containing 1 to 3 aromatic rings, either fused or linked, and either unsubstituted or substituted with 1 or more substituents typically selected from the group consisting of lower alkyl, lower alkoxy, halogen, and the like. Preferred aryl substituents contain 1 aromatic ring or 2 fused or linked aromatic rings, and particularly preferred aryl substituents are monocyclic. The term "arylene" refers to a difunctional aromatic species containing 1 to 3 aromatic rings substituted with 1 or more substituents as above. Preferred arylene substituents contain 1 aromatic ring (e.g., phenylene) or 2 fused or linked aromatic rings (e.g., biphenylylene), and particularly preferred arylene substituents are monocyclic.

The term "aralkyl" intends a moiety containing both alkyl and aryl species, typically containing less than about 24 carbon atoms, and more typically less than about 12 carbon atoms in the alkyl segment of the moiety, and typically containing 1 to 5 aromatic rings. The term "aralkyl" will usually be used to refer to aryl-substituted alkyl groups. The term "alkaryl" refers to an aryl group that has an alkyl substituent. Similarly, the term "aralkylene" refers to an alkylene group that has an aryl substituent, while "alkarylene" refers to an arylene group with an alkyl substituent.

The term "comonomer" in an addition polymerization refers to the hydrolyzable comonomer, unless otherwise indicated.

A "diene comonomer" is incorporated as a "chain extender" when both double bonds are incorporated into the polymer backbone in a linear fashion, as opposed to incorporation as a crosslinker, wherein the two double bonds are incorporated into separate polymer chains.

The term "halo" or "halogen" is used in its conventional sense to refer to a chloro, bromo, fluoro or iodo substituent. The terms "haloalkyl," "haloalkenyl" or "haloalkynyl" (or "halogenated alkyl," "halogenated alkenyl," or "halogenated alkynyl") refers to an alkyl, alkenyl or alkynyl group, respectively, in that at least one hydrogen atom in the group has been replaced with a halogen atom.

The term "hydrocarbyl" is used in its conventional sense to refer to a hydrocarbon group containing carbon and hydrogen, and may be aliphatic, alicyclic or aromatic, or may contain a combination of aliphatic, alicyclic and/or aromatic moieties. Aliphatic and alicyclic hydrocarbyl may be saturated or they may contain one or more unsaturated bonds, typically double bonds. The hydrocarbyl substituents herein generally contain 1 to 24 carbon atoms, more typically 1 to 12 carbon atoms, and may be substituted with various substituents and functional groups, or may be modified so as to contain ether and/or thioether linkages. The term "hydrocarbylene" refers to a difunctional hydrocarbyl group, i.e., a hydrocarbyl group that is bound to two distinct molecular moieties. The term "lower hydrocarbylene" intends a hydrocarbylene group of one to six carbon atoms, preferably one to four carbon atoms.

The term "polymer" is used herein in its conventional sense to refer to a compound having two or more monomer units, and is intended to include homopolymers, i.e., polymers in which all monomer units are the same, as well as copolymers, wherein two or more different monomer units are present. The term "monomer" is used herein to refer to compounds that are not polymeric.

The term "substituent," as in hydrocarbyl or hydrocarbylene substituted with a "substituent," is used herein to refer to a functional group or non-hydrogen substituent bound to an atom of a molecular moiety herein. Those skilled in the art will appreciate that the compounds and molecular segments drawn and defined herein may be unsubstituted, substituted as specifically indicated, or substituted with other substituents. The substituent groups do not substantially interfere with the process. "Monosubstituted" refers to a hydrocarbyl or hydrocarbylene group having one substituent group and "disubstituted" refers to a hydrocarbyl or hydrocarbylene group containing two substituted groups. Examples of substituents that may be present in the compounds of the invention include, but are not limited to, halo, particularly chloro; hydroxy; alkoxy, particularly lower alkoxy, such as methoxy, n-propoxy and t-butoxy; primary amino ($NH_2$); secondary amino, typically lower alkyl-substituted amino; tertiary amino, typically lower alkyl-disubstituted amino; nitro; acyloxy, which may be represented as R'COO—; acylamido, which may be represented as R'CONH— and thiol analogs thereof (R'CSO— and R'CSNH—, respectively), wherein R' is alkyl, typically lower alkyl; carboxy (—C(O)OH); alkoxycarbonyl (—C(O)

OR'); carbamyl (—C(O)NH$_2$); alkylcarbamyl (C(O)NHR'); alkylsulfonyl (R'SO$_2$—); and alkylphosphonyl (R'P(OR')O—). The terms "alkyl," "alkenyl," "hydrocarbyl," etc. as used herein are intended to encompass not only unsubstituted groups but substituted groups containing one or more "substituents" as just defined.

"Optional" or "optionally" means that the subsequently described event or circumstance may or may not occur, and that the description includes instances wherein said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

A "heterogeneous" catalyst as used herein refers to a catalyst supported on a carrier, typically although not necessarily a substrate comprised of an inorganic, solid, particulate porous material such as silicon and/or aluminum oxide.

A "homogeneous" catalyst as used herein refers to a catalyst that is not supported but is simply admixed with the initial monomeric components in a suitable solvent.

A "soluble transition metal catalyst" refers to an organometallic catalyst, based on a transition metal complex, used in homogenous polymerization of olefinic monomers. Well-known examples are Ziegler-Natta catalysts, metallocene catalysts, and Brookhart-type catalysts, discussed further below.

As used herein all reference to the Periodic Table of the Elements and groups thereof is to the version of the table published by the Handbook of Chemistry and Physics, CRC Press, 1995, which uses the IUPAC system for naming groups.

II. HYDROLYTICALLY DEGRADABLE OLEFIN COPOLYMERS

The present polymers may be used in drug delivery devices and packaging and are considered especially advantageous in the latter application, e.g., in packaging and disposable containers, that are frequently fabricated from the corresponding homopolymers (e.g., polyethylene, polypropylene or polystyrene). Another significant use is in fabrication of disposable diapers. Methods of fabrication of such products are well known in the art. Components of disposable diapers, for example, are typically fabricated from spunbonded nonwoven fabrics formed from polyolefins. See, for example, Smorada, 1987; Raley, 1988; Kubo et al., 1991; and Alikhan et al., 1998, and references cited therein.

The subject copolymers are hydrolytically degradable olefin copolymers without adjacent hydrolyzable monomers, comprising a first monomer unit that is not hydrolyzable and a second monomer unit that is hydrolyzable.

The first monomer unit derives from a first addition polymerizable monomer of the form CH$_2$R$^1$=CH$_2$R$^2$, wherein R$^1$ is hydrido or alkyl, preferably hydrido or lower alkyl, most preferably hydrido, and R$^2$ is hydrido, alkyl, alkenyl, aryl, alkaryl or halogen, or wherein R$^1$ and R$^2$ are linked to form —Q— wherein Q is substituted or unsubstituted hydrocarbylene, typically of 1 to 24 carbon atoms, preferably of 1 to 12 carbon atoms.

Particularly preferred such monomers are α-olefins having from about 2 to about 20 carbon atoms, such as, for example, linear or branched olefins including ethylene, propylene, 1-butene, 3-methyl-1-butene, 1,3-butadiene, 1-pentene, 4-methyl-1-pentene, 1-hexene, 4-methyl-1-hexene, 1,4-hexadiene, 1,5-hexadiene, 1-octene, 1,6-octadiene, 1-nonene, 1-decene, 1,4-dodecadiene, 1-hexadecene, 1-octadecene, and mixtures thereof. Cyclic olefins and diolefins may also be used; such compounds include, for example, cyclopentene, 3-vinylcyclohexene, norbornene, 5-vinyl-2-norbornene, 5-ethylidene-2-norbornene, dicyclopentadiene, 4-vinylbenzocyclobutane, tetracyclododecene, dimethano-octahydronaphthalene, and 7-octenyl-9-borabicyclo-(3,3,1)nonane. Aromatic olefinic and vinyl monomers that may be polymerized using the present method include, but are not necessarily limited to, styrene, o-methylstyrene, m-methylstyrene, p-methylstyrene, p-tert-butylstyrene, m-chlorostyrene, p-chlorostyrene, p-fluorostyrene, indene, 4-vinylbiphenyl, acenaphthalene, vinylfluorene, vinylanthracene, vinylphenanthrene, vinylpyrene and vinylchrisene. Still other monomers that may be polymerized within the context of the present method include methylmethacrylate, ethylacrylate, vinyl silane, phenyl silane, trimethylallyl silane, acrylonitrile, maleimide, vinyl chloride, vinylidene chloride, tetrafluoroethylene, isobutylene, carbon monoxide, acrylic acid, 2-ethylhexylacrylate, methacrylonitrile and methacrylic acid.

The second monomer unit derives from monomers having the structure

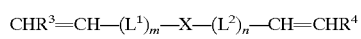

wherein R$^3$, R$^4$, L$^1$, L$^2$, m, n and X are as defined below.

R$^3$ and R$^4$ are independently hydrido, alkyl, aryl or substituted aryl, generally hydrido or lower alkyl, preferably hydrido or methyl, and most preferably are all hydrido.

The subscripts m and n are independently 0 or 1.

L$^1$ and L$^2$ are optionally substituted hydrocarbylene groups, preferably alkylene or alkenylene, generally alkylene, preferably lower alkylene. However, m and n may be 0, and thus L$^1$ and L$^2$ may be absent.

X is a group that is hydrolytically cleavable under aqueous conditions, generally at acidic or basic pH. To prevent deactivation of the polymerization catalyst, X does not include a group containing an active hydrogen, e.g., a hydroxyl group, a primary or secondary amino group, or a thiol group, nor does it contain any group that could oxidize the metal center of the catalyst. Preferred hydrolyzable linkages include carboxylic esters, imides, anhydrides, acetals, and ketals. Of these, acetals and ketals are particularly preferred. Exemplary monomers containing a hydrolyzable linkage include, but are not limited to:

esters having the structure

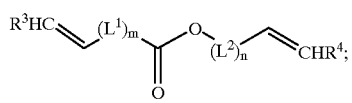

enol ethers having the structure

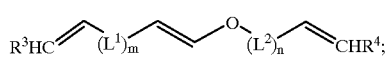

acetals having the structure

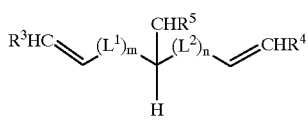

wherein $R^3$, $R^4$, $L^1$, $L^2$, m and n are as defined above, and $R^5$ is independently hydrido or alkyl, preferably hydrido or lower alkyl, most preferably hydrido;
diketene acetals having the structure

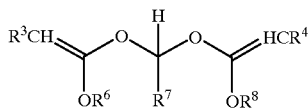

wherein $R^3$, $R^4$, $L^1$, $L^2$, m and n are as defined above and $R^6$, $R^7$ and $R^8$ are independently hydrido or alkyl, preferably hydrido or lower alkyl, most preferably hydrido;
ketals having the structure

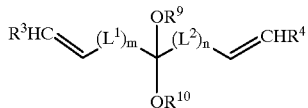

wherein $R^3$, $R^4$, $L^1$, $L^2$, m and n are as defined above and $R^9$ and $R^{10}$ are independently hydrido or alkyl, preferably hydrido or lower alkyl, most preferably hydrido;
anhydrides having the structure

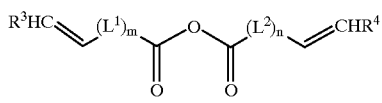

wherein $R^3$, $R^4$, $L^1$, $L^2$, m and n are as defined above;
cyclic diketenes having the structure

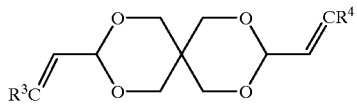

wherein $R^3$ and $R^4$ are as defined above;
siloxanes having the structure

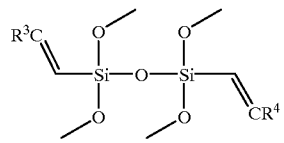

wherein $R^3$ and $R^4$ are as defined above; and
imines having the structure

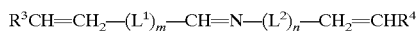

wherein $R^3$, $R^4$, $L^1$, $L^2$, m and n are as defined above. A sample comonomer, containing two ketal linkages, which is commercially available and readily prepared from acrolein and pentaerythritol, is 3,9-divinyl-4,6,8,10-tetraoxaspiro [5.5]undecane, having the structural formula

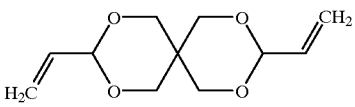

Analogs or homologs of this compound may also be used.

The copolymers are formed by polymerization, catalyzed by a soluble transition metal catalyst, as described further below. The molecular weight of the copolymer is sufficient to provide the physical properties required for the final use of the copolymer, e.g., in packaging, disposable containers, disposable diapers, etc. For example, the molecular weight (weight average) of a polyethylene copolymer will preferably be in the range of about 60,000 to about 300,000 or greater, an approximate useful range for commercial linear polyethylenes.

The hydrolyzable component of the copolymer is found within the second monomeric unit, —$CHR^3$—$CH_2$—$(L^1)_m$—X—$(L^2)_n$—$CH_2$—$CHR^4$—, incorporated within the backbone of the copolymer wherein $R^3$, $R^4$, $L^1$, $L^2$, m and n are as defined above. Accordingly, the copolymer is degraded at the linkage X under aqueous conditions, generally involving acidic or basic hydrolysis, thus breaking a high molecular weight copolymer into lower molecular weight segments. Depending on the nature of X, these lower molecular weight segments typically have polar end groups, thus increasing the water solubility, or dispersability, of the fragments.

To increase the effectiveness of the hydrolyzable comonomer in degradation of the copolymer, the copolymer has no adjacent hydrolyzable monomer units and none would be expected to occur in the polymerizations described herein. It will be appreciated that copolymers having a higher ratio of hydrolyzable comonomer to olefinic monomer will undergo a greater reduction in average molecular weight on degradation. Higher levels of hydrolyzable comonomer will also generally have a greater effect on the physical properties, such as the hydrophobicity, of the copolymer, and are expected to reduce degree of polymerization (i.e., molecular weight) as well. Therefore, the amount of hydrolyzable comonomer to be incorporated will depend on the final use, and desired extent of degradability, of the copolymer. For most applications, an incorporation of about 0.1 mole percent to about 50 mole percent of hydrolyzable comonomer (corresponding to a 99.9:1 to 1:1-ratio of olefin to hydrolyzable comonomer) is appropriate, with a range of 1 to 25 mole percent (99:1 to 3:1-ratio) preferred.

III. POLYMERIZATION

The copolymers are prepared by transition metal-catalyzed polymerization, a preferred method for forming olefin copolymers with good control of molecular weight, molecular weight distribution, and stereoregularity. Procedures for such polymerizations are well known in the art. In general, the present polymers are prepared using transition metals in combination with a conventional "cocatalyst" or "catalyst activator" as will be appreciated by those skilled in the art. Thus, prior to use, the compounds of the invention are incorporated into a catalyst system that includes such an activator. Suitable catalyst activators include metal alkyls, hydrides, alkylhydrides, and alkylhalides, such as alkyllithium compounds, dialkylzinc compounds, trialkyl boron compounds, trialkylaluminum compounds, alkylaluminum halides and hydrides, and tetraalkylgermanium compounds. Specific examples of useful activators include n-butyllithium, diethylzinc, di-n-propylzinc, triethylboron, triethylaluminum, triisobutylaluminum, tri-n-hexylaluminum, ethylaluminum dichloride, dibromide and dihydride, isobutyl aluminum dichloride, dibromide and dihydride, di-n-propylaluminum chloride, bromide and hydride, diisobutyl-aluminum chloride, bromide and hydride, ethylaluminum sesquichloride, methyl aluminoxane ("MAO"), hexaisobutyl aluminoxane, tetraisobutyl aluminoxane, polymethyl aluminoxane, tri-n-octylaluminum, tetramethyl germanium, and the like. Other activators that are typically referred to as ionic cocatalysts may also be used; such compounds include, for example, $(C_6H_6)_3^+$, $C_6H_5—NH_2CH_3^+$, and fluorohydrocarbylboron compounds such as tetra(pentafluorophenyl)borate, sodium tetrakis[(bis-3,5-trifluoromethyl)phenyl]borate, $H^+(OCH_2CH_3)_2$[(bis-3,5-trifluoromethyl)-phenyl]borate, trityltetra(pentafluorophenyl)borate and tris (pentafluorophenyl)boron. Mixtures of activators may, if desired, be used. Generally, the catalyst activator is such that upon combination with the selected transition metal catalyst, a catalytically active ionic species results.

Metallocene catalysts, one form of soluble transition metal catalyst well known in the art, are generally derived from complexes of Group IV, V, or VI transition metals, typically Ti, Hf, or Zr; complexes of V, Nb and Mo are also employed. These complexes include at least one ligand derived from a cyclopentadiene ring, or a multiring system containing a cyclopentadiene ring, such as fluorene or indene. The ring or ring system may be substituted with alkyl, aryl, or other groups not containing active hydrogen, such as ethers, tertiary amines, tertiary boranes, tertiary silanes, or halides. Other ligands on the transition metal are typically halides, lower alkyl groups, or tertiary amines, but may also be selected from a wide variety of other groups, such as aryl, alkoxy, acetoacetate, carbonyl, nitrile, isonitrile, tertiary amine or phosphine, π-allyl, or cyclic unsaturated hydrocarbons such as cycloheptatriene. Two of the ligands may be bridged, e.g., by a chain containing linkages selected from alkyl and alkylsilane, to formed constrained-geometry catalysts. Examples of metallocene catalysts include cyclopentadienyl titanium trichloride, bis (cyclopentadienyl)zirconium dichloride, bis (cyclopentadienyl)dimethyl zirconium, (pentamethylcyclopentadienyl)titanium trimethoxide, bis-2-(3,5-di(trifluoromethyl)phenyl)-indenyl hafnium dichloride, (3,5-di(trifluoromethyl)phenyl)indenyl hafnium trichloride, and bridged compounds such as dimethylsilylbis (cyclopentadienyl)hafnium dichloride, dimethylsilylbis(2-methyl-4-phenyl indenyl)zirconium dichloride, and (tert-burylamido)dimethyl (cyclopentadienyl)silane zirconium dichloride.

Also useful are Brookhart-type catalysts, based on 1,2-diimine complexes of Group I or Group VIII transition metals, particularly Ni, Pd, Fe, and Co; Cu, Ag, and Au complexes have also been described. These catalysts are typically cationic complexes of the form [(ArN=CR'—CR"=NAr)M(CH$_3$)(OEt$_2$)]$^+$B(Ar$^1$)$_4^-$, wherein M is Ni or Pd, Ar is a mono, bi, or tricyclic aryl group, preferably phenyl, optionally substituted with one or two substituent groups, Ar$^1$ is 3,5-C$_6$H$_3$(CF$_3$)$_2$, Et is ethylene and R' and R" are independently hydrido, methyl, or together 1,8-naphthyl. See, for example, Johnson et al. (1995, 1996) and Killian et al. Related cobalt- and iron-based catalysts employ tridentate imine ligands (Small et al.). Other complexes may be used having imine-containing ligands other than diimines, or analogous pyridyl-containing or bipyridyl ligands.

The catalysts are used to prepare polymeric compositions using conventional polymerization techniques known to those skilled in the art and/or described in the pertinent literature. The monomer(s), catalyst and catalyst activator are contacted at a suitable temperature at reduced, elevated or atmospheric pressure, under an inert atmosphere, for a time effective to produce the desired polymer composition. The catalyst may be used as is or supported on a suitable support. In one embodiment, the catalysts are used as homogeneous catalysts, i.e., as unsupported catalysts, in a gas phase or liquid phase polymerization process. A solvent may, if desired, be employed. The reaction may be conducted under solution or slurry conditions, in a suspension using a perfluorinated hydrocarbon or similar liquid, in the gas phase, or in a solid phase powder polymerization. Various additives may be incorporated into the mixture; particularly preferred additives are neutral Lewis bases such as amines, anilines and the like, which can accelerate the rate of polymerization.

Liquid phase polymerization generally involves contacting the monomer or monomers with the catalyst/activator mixture in a polymerization diluent, and allowing reaction to occur under polymerization conditions, i.e., for a time and at a temperature sufficient to produce the desired polymer product. The polymerization diluents are generally inert substances for example, aliphatic or aromatic hydrocarbons, e.g., liquified ethane, propane, butane, isobutane, n-butane, n-hexane, isooctane, cyclohexane, methylcyclohexane, cyclopentane, methylcyclopentane, cycloheptane, methylcycloheptane, benzene, ethylbenzene, toluene, xylene, kerosene, Isopar® M, Isopar® E, and mixtures thereof. Liquid olefins or the like which serve as the monomers or comonomers in the polymerization process may also serve as the diluent; such olefins include, for example, ethylene, propylene, butene, 1-hexene and the like.

The amount of catalyst in the diluent will generally be in the range of about 0.01 to 1.0 mmoles/liter, with activator added such that the ratio of catalyst to activator is in the range of from about 10:1 to 1:2000, preferably in the range of from about 1:1 to about 1:1200, on a molar basis.

Polymerization may be conducted under an inert atmosphere such as nitrogen, argon, or the like, or may be conducted under vacuum. Preferably, polymerization is conducted in an atmosphere wherein the partial pressure of reacting monomer is maximized. Liquid phase polymerization may be carried out at reduced, elevated or atmospheric pressures. In the absence of added solvent, i.e., when the olefinic monomer serves as the diluent, elevated pressures are preferred. Typically, high pressure polymerization in the absence of solvent is carried out at temperatures in the range of about 180° C. to about 300° C., preferably in the range of about 250° C. to about 270° C., and at pressures on the order of 200 to 20,000 atm, typically in the range of about 1000 to 3000 atm. When solvent is added, polymerization is generally conducted at temperatures in the range of about 150° C. to about 300° C., preferably in the range of about 220° C. to about 250° C., and at pressures on the order of 10 to 2000 atm.

Polymerization may also take place in the gas phase, e.g., in a fluidized or stirred bed reactor, using temperatures in the range of approximately 60° C. to 120° C. and pressures in the range of approximately 10 to 1000 atm.

In gas and slurry phase polymerizations, the catalyst is used in a heterogeneous process, i.e., supported on an inert inorganic substrate. Conventional materials can be used for the support, and are typically particulate, porous materials; examples include oxides of silicon and aluminum, or halides of magnesium and aluminum. Particularly preferred supports from a commercial standpoint are silicon dioxide and magnesium dichloride.

The polymeric product resulting from the aforementioned reaction may be recovered by filtration or other suitable techniques. If desired, additives and adjuvants may be incorporated into the polymer composition prior to, during, or following polymerization; such compounds include, for example, pigments, antioxidants, lubricants and plasticizers.

According to generally accepted mechanisms of addition polymerization using transition metal catalysts, incorporation of a monomer having a bulky substituent on the double bond, as in the hydrolyzable comonomers described herein, reduces the rate of further propagation. Thus, the reactive intermediate, having incorporated the hydrolyzable comonomer, is more likely to next undergo a chain transfer or terminating step than to continue propagation. For this reason, contiguous blocks of the hydrolyzable comonomer are not expected to be produced. In addition, it is expected that the hydrolyzable monomers are incorporated as chain extending components (that is, contained within the linear backbone of the polymer), rather than as crosslinking components. The latter structure would result from further propagation after addition of the diene monomer, which is not expected to be favorable. However, because this feature of metallocene catalysis varies among individual catalysts, some degree of crosslinking could be incorporated, if desired, by the use of a catalyst less sensitive to bulky substituents.

It is to be understood that while the invention has been described in conjunction with the preferred specific embodiments thereof, that the description above as well as the examples which follow are intended to illustrate and not limit the scope of the invention. Other aspects, advantages and modifications within the scope of the invention will be apparent to those skilled in the art to which the invention pertains.

All patents, patent applications, journal articles and other reference cited herein are incorporated by reference in their entireties.

EXPERIMENTAL

The following examples are put forth so as to provide those of ordinary skill in the art with a complete disclosure and description of how to prepare and use the catalysts of the invention. Efforts have been made to ensure accuracy with respect to numbers (e.g., amounts, temperature, etc.) but some errors and deviations should be accounted for. Unless indicated otherwise, parts are parts by weight, temperature is in °C. and pressure is at or near atmospheric.

Examples 1 (a)–(c) describe metallocene-catalyzed polymerizations of ethylene with 3,9-divinyl-4,6,8,10-tetraoxaspiro[5.5]undecane, i.e., a hydrolyzable comonomer having the structure

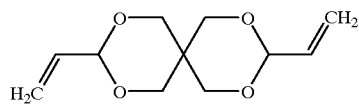

The amount of comonomer used (1.0 g) was about 20–25 mole percent based on the estimated initial amount of ethylene in the pressurized reactor. The reactions were carried out at low to moderate temperature and pressure; i.e., 0 to 50° C. and less than 100 psi. NMR analysis clearly showed incorporation of the monomer, estimated, from integration of the peaks, to be about 20 mole percent. The polymer of Example 1 (a) was obtained as a dry, powdery solid having a number average molecular weight ($M_n$) of about 54,000–64,000 and a weight average molecular weight ($M_w$) of about 140,000–173,000. Although some degree of crosslinking could not be ruled out, gel permeation chromatography (GPC) did not give any evidence of significant crosslinking in these samples.

EXAMPLE 1

PREPARATION OF ETHYLENE/3,9-DIVINYL-4,6,8,10-TETRAOXASPIRO[5.5]UNDECANE COPOLYMER (a) A glass reactor was flushed with argon and charged with 100 mL of toluene and 1.0 g of 3,9-divinyl-4,6,8,10-tetraoxaspiro[5.5]undecane. The reactor was then flushed with ethylene, and the solution was stirred with an overhead mechanical stirrer. A solution of 0.5 g TMA (trimethylaluminum)-free MAO (methyl aluminoxane) in 2 mL toluene was added, and the reactor was pressurized with ethylene to 25 psi for 1 minute. The pressure was released, and a catalyst/MAO mixture, prepared from 0.5g TMA-free MAO in 2 mL of toluene and 0.013 mmoles of catalyst 1

Catalyst 1

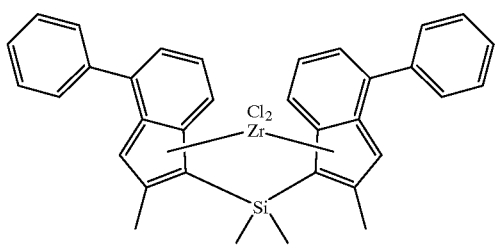

($Me_2Si(C_{16}H_{12})_2ZrCl_2$, MW 628.83, available from Hoechst; $C_{16}H_{12}$≡2-methyl-4-phenylindenyl), was added. The reactor was then pressurized to 45 psi ethylene and isolated from the ethylene supply. The pressure drop was monitored over the next two hours (reaction carried out at about 20° C.) and observed to drop by 16 psi. When little further pressure drop was detected, at about 100 min, the reaction was quenched with 2×10 mL methanol. The polymer was isolated by filtration, washed with methanol, and dried under vacuum for 16 hours to give 1.27 g of a powdery solid.

(b) The reaction was repeated using 0.0123 mmol catalyst 2

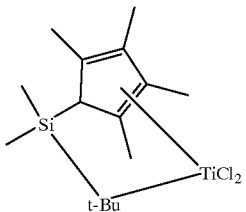

Catalyst 2

(Me$_2$Si(1,2,3,4-tetramethyl cyclopentadiene)(t-buN)TiCl$_2$), obtained from The Dow Chemical Company), and the same amounts of the remaining reagents. The reaction was conducted as described above and gave 1.3 g product in 1 hour.

(c) The reaction was repeated using 0.013 mmol catalyst (Me$_2$Si(1,2,3,4-tetramethyl cyclopentadiene)(t-buN)TiCl$_2$), and the same amounts of the remaining reagents. The reaction proceeded somewhat more slowly and gave 0.672 g of a powdery solid.

EXAMPLE 2

PROTON NMR CHARACTERIZATION

Figure 2:
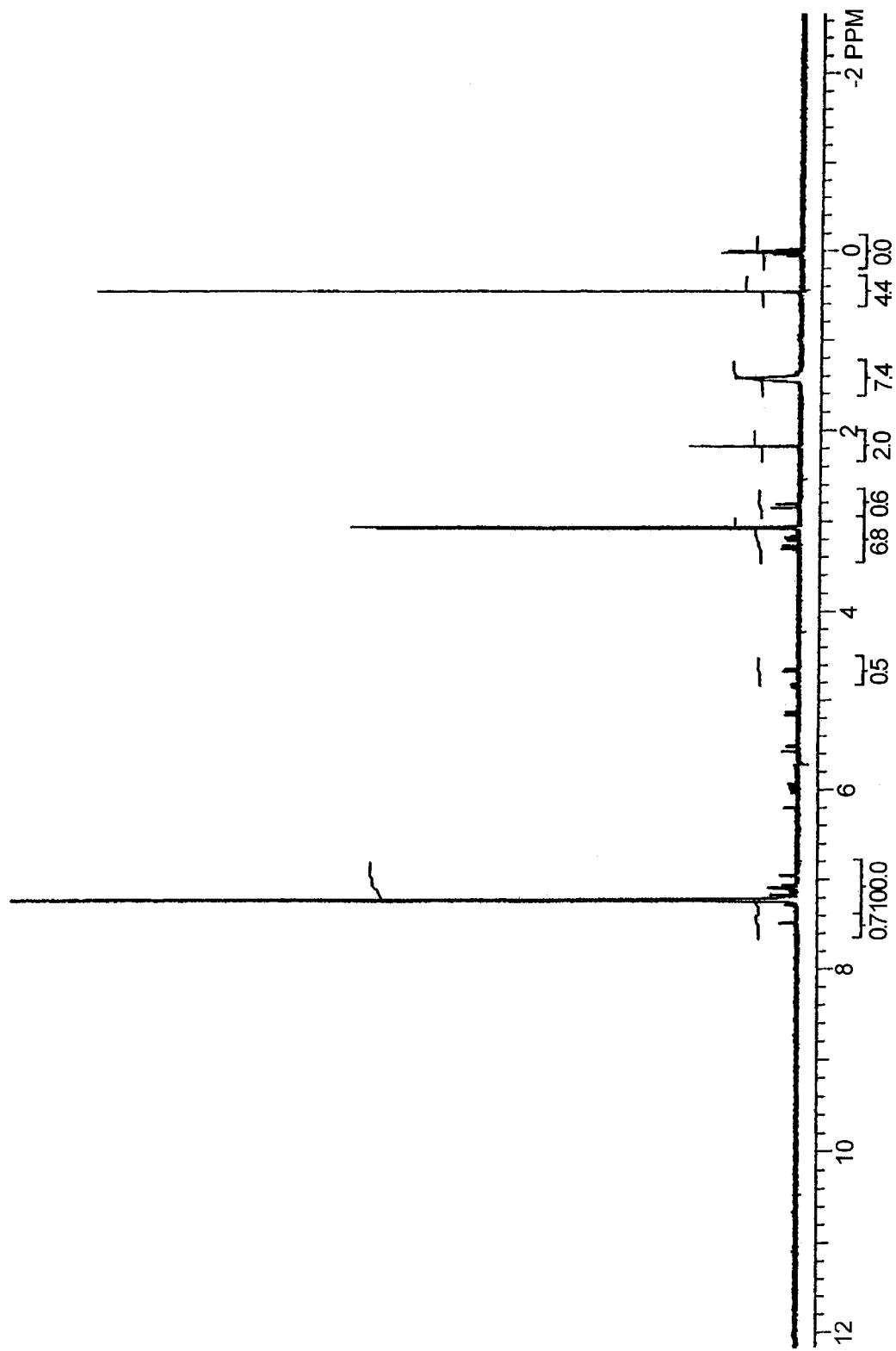

Proton NMR of the divinyl-tetraoxaspiro undecane and the copolymer prepared therefrom, in Example 1 (a), established the incorporation of the comonomer (FIGS. 1–2). Based on the NMR data, the structure of the copolymer appears to be that of a single stranded polyethylene chain with incorporation of the comonomer primarily as chain extender, with some degree of monofunctional incorporation of the comonomer (i.e., as a short side chain).

EXAMPLE 3

MW DETERMINATION

The procedure of Example 1 (a) was repeated. The molecular weights of the products obtained from the initial polymerization reaction and the repeated polymerization reaction were then estimated via gel permeation chromatography (GPC), using as standards a 106,096 M$_W$ polyethylene and a 52,497 M$_W$ polyethylene. Each analysis gave a single peak. The first sample gave a M$_n$ (number average molecular weight) of 53,787 and a M$_W$ (weight average molecular weight) of 172,503; the second sample gave a M$_n$ of 64,260 and a M$_W$ of 139,782.

EXAMPLE 4

HYDROLYSIS OF COPOLYMERS

Figure 3:
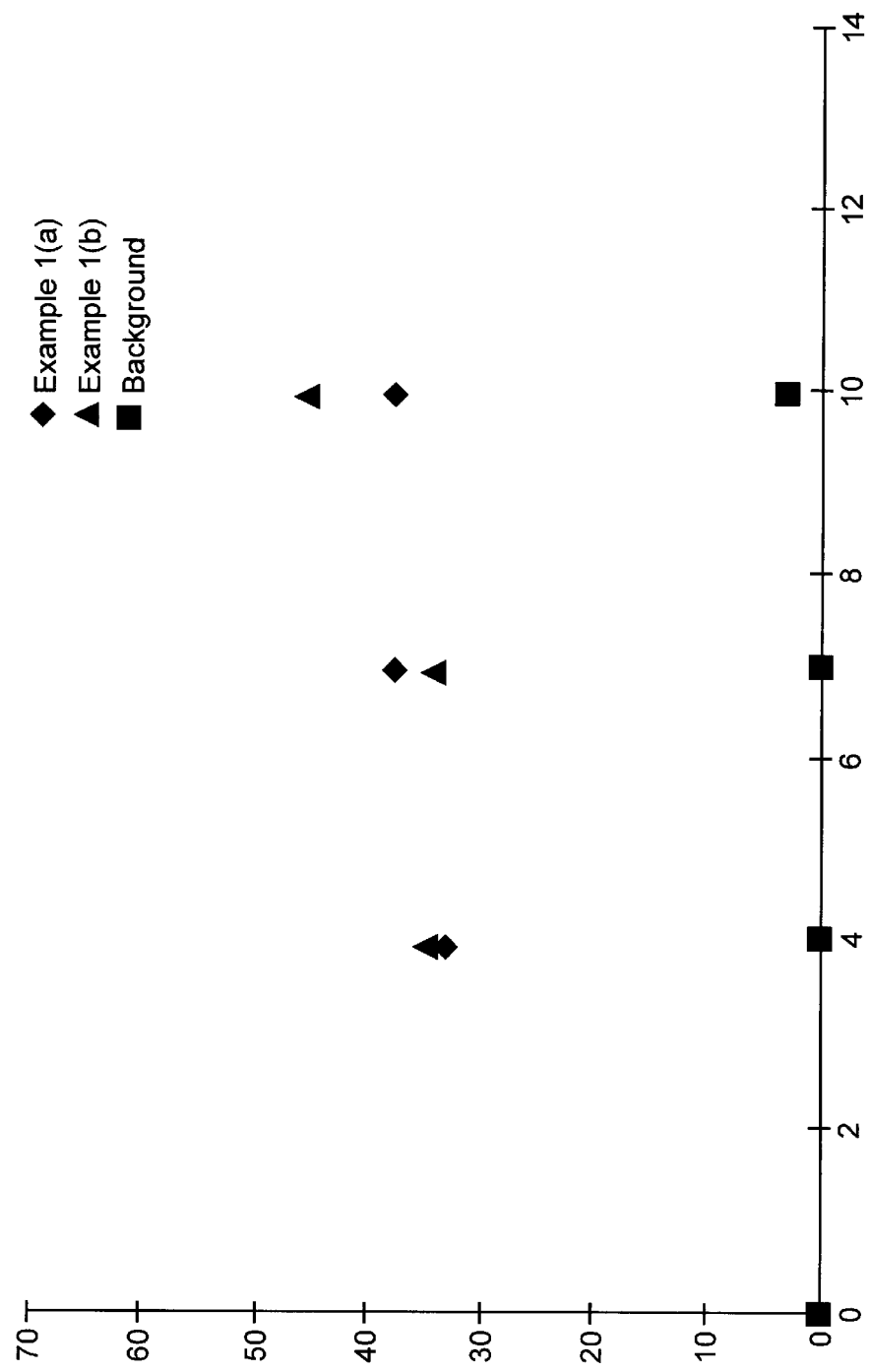
FIG. 3 is a graph of hydrolysis data showing the percentage of dissolved polymer relative to pH as described in Example 4.

Three 0.2 g samples of each of the copolymers prepared in Examples 1(a) and (b) were placed in 10 ml of pH 4, pH 7 and pH 10 buffer solutions. The six solutions were stirred for 18 hours at ambient temperature. After stirring the samples were centrifuged for 5 minutes and the liquid decanted off. The samples were transferred into vials and dried overnight in a vacuum samples were then weighed. The results are presented in Table 1 and in FIG. 3.

TABLE 1

| | Hydrolysis of Copolymer | | | |
|---|---|---|---|---|
| | Sample 1(a) | Sample 1(b) | Percent Dissolution | |
| pH | Weight in grams | Weight in grams | 1(a) | 1(b) |
| 4 | 0.134 | 0.131 | 33.0% | 34.5% |
| 7 | 0.125 | 0.132 | 37.5% | 34.0% |
| 10 | 0.125 | 0.110 | 37.5% | 45.0% |

What is claimed is:

1. A process for producing a degradable olefin copolymer, comprising reacting, in the presence of a metallocene complex of a Group IV, Group V, or Group VI transition metal and under polymerization conditions:

(a) a first olefinic monomer of the form CH$_2$R$^1$=CH$_2$R$^2$, wherein
   R$^1$ is hydrido or alkyl,
   R$^2$ is hydrido, alkyl, alkenyl, aryl, alkaryl or halogen,
   or wherein
   R$^1$ and R$^2$ are linked to form —Q— wherein Q is substituted or unsubstituted hydrocarbylene; and (b) a second olefinic monomer of the form

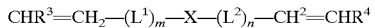
   CHR$^3$=CH$_2$—(L$^1$)$_m$—X—(L$^2$)$_n$—CH$^2$=CHR$^4$ wherein
   R$^3$ and R$^4$ are independently hydrido, alkyl, aryl or substituted aryl,
   L$^1$ and L$^2$ are optionally substituted hydrocarbylene groups,
   m and n are independently 0 or 1, and
   X is a group that is hydrolytically cleavable under aqueous conditions.

2. The process of claim 1, wherein R$^1$ and R$^2$ are independently hydrido or lower alkyl.

3. The process of claim 2, wherein R$^1$ and R$^2$ are hydrido, such that the copolymer is an ethylene copolymer.

4. The process of claim 2, wherein one of R$^1$ and R$^2$ is hydrido and the other is methyl, such that the copolymer is a propylene copolymer.

5. The process of claim 1, wherein said second olefinic monomer is incorporated at a mole percent of about 0.1% to about 50%.

6. The process of claim 5, wherein said second olefinic monomer is incorporated at a mole percent of about 1% to about 25%.

7. The process of claim 1, wherein X is hydrolytically cleavable under acidic conditions.

8. The process of claim 1, wherein X is hydrolytically cleavable under basic conditions.

9. The process of claim 1, wherein X is derived from 3,9-divinyl-4,6,8,10-tetraoxaspiro[5.5]undecane.

10. The process of claim 1, wherein X comprises an acetal, ketal, ester or imide linkage.

11. The process of claim 1, wherein said transition metal is selected from Ti, Hf, Zr, V, Nb, and Mo.

12. The process of claim 1, wherein said transition metal catalyst is a diimine complex of a Group I or Group VIII transition metal.

13. The process of claim 13, wherein said transition metal is selected from Pd, Ni, Fe, Co, Cu, Ag, and Au.

14. The process of claim 1, wherein polymerization is conducted in the presence of a cocatalyst.

15. The process of claim 11, wherein the cocatalyst is aluminum-containing.

16. The process of claim 16, wherein the cocatalyst is methyl aluminoxane (MAO).

* * * * *